United States Patent

[11] 3,578,212

| [72] | Inventors | Rudolf Greiner;<br>Rudolf Oberli, Langenthal, Switzerland |
|---|---|---|
| [21] | Appl. No. | 876,782 |
| [22] | Filed | Nov. 14, 1969 |
| [45] | Patented | May 11, 1971 |
| [73] | Assignee | Greiner Electronic AG<br>Langenthal, Switzerland |
| [32] | Priority | Mar. 31, 1969 |
| [33] | | Sweden |
| [31] | | 4833/69 |

[54] LIQUID DOSAGE APPARATUS
8 Claims, 1 Drawing Fig.

[52] U.S. Cl. .................................................... 222/71
[51] Int. Cl. ..................................................... B67d 5/16
[50] Field of Search ........................................ 222/71, 72, 74, 75, 539, 178; 239/588

[56] References Cited
UNITED STATES PATENTS
1,981,507  11/1934  Harris ............................ 222/72

| 3,036,738 | 5/1962 | Sonnberg ...................... | 222/72X |
| 3,212,676 | 10/1965 | Trumbull et al. ............. | 222/71 |
| 3,216,619 | 11/1965 | Richards ...................... | 222/74 |

*Primary Examiner*—Robert B. Reeves
*Assistant Examiner*—Thomas E. Koeovsky
*Attorney*—Lawrence E. Laubscher ABSTRACT: Liquid dosage dispensing apparatus, characterized by the combination of means for pumping a selected quantity of liquid from constant liquid level container means to a discharge nozzle, and nozzle positioning means for displacing the nozzle from an initial storage position in which the nozzle is partially submerged in the container liquid to a dispensing position relative to a liquid receiver. The dosage pump means include reciprocatory piston means alternately operable to draw, by suction, a desired volume of liquid into a chamber and to discharge this desired volume from the chamber. Slide valve means are provided that tee operable in synchronism with the piston to connect the chamber alternately with the container and with the nozzle means, respectively.

Patented May 11, 1971  3,578,212
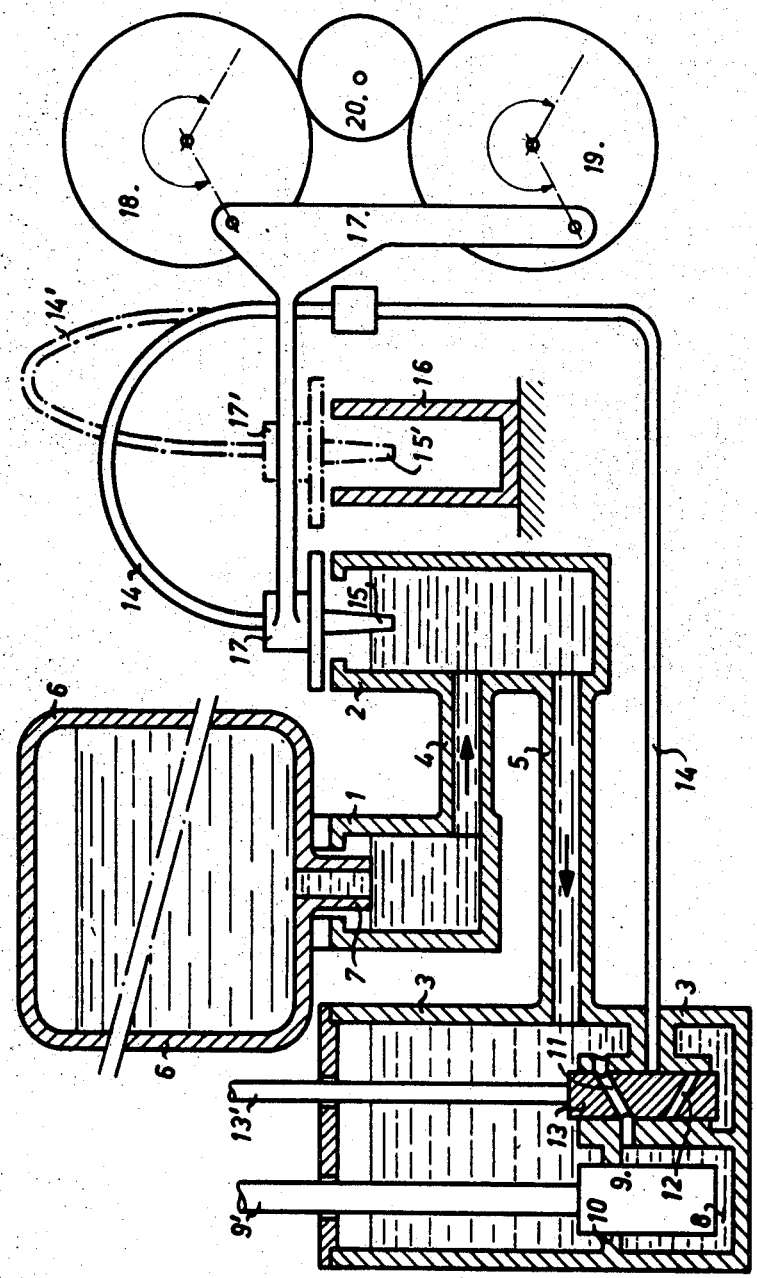
Rudolf Greiner &
Rudolf Oberli
  INVENTORS
BY
Lawrence E. Laubscher
  ATTORNEY

LIQUID DOSAGE APPARATUS

It is well known in the patented prior art to provide dosage apparatus that are used to dispense a predetermined volume of a liquid. One drawback of the known devices is that they are subject to disturbances or sources of errors—particularly if they are not used for long periods of time—which impair the instantaneous operational readiness thereof. Such disturbances are likely to occur when the liquid to be dispensed has the tendency to precipitate salts or the like which are deposited on the vital surfaces of the dosage apparatus. On the other hand, the aforementioned source of error may be produced also if the liquid to be dispensed evaporates relatively rapidly. The present invention was developed to provide an improved dosage apparatus which effectively eliminates the above and other drawbacks of the known devices.

Accordingly, the primary object of the present invention is to provide an improved dosage apparatus having pump means for withdrawing a desired volume of liquid from a constant liquid level container, and for pumping this desired volume to dispensing nozzle means. Nozzle positioning means are provided for displacing the nozzle from a storage position partially submerged beneath the container liquid to a dispensing position relative to a liquid receiver.

According to a more specific object of the invention the dosage pump means is disposed in a stationary manner and is equipped with a measuring chamber and a measuring piston. The pump means are connected with the nozzle means by a flexible conduit, whereby upon movement of the piston during the suction stroke, liquid is initially withdrawn by suction out of the container into the measuring chamber, and thereafter, by virtue of the movement of the measuring piston in the opposite direction, forces the liquid out of the measuring chamber and through the flexible conduit into a receiving receptacle kept in readiness for that purpose.

In accordance with another object of the invention, the nozzle positioning means includes pinion-operated arm means for displacing the nozzle from the initial partially submerged storage position to the discharge position relative to liquid receiver means.

According to a further object of the invention, the assembly or combination of the container and the dosage pump is preferably so designed that each of the operating members for actuating the dosage pump extends through the free liquid surfaces upwardly out of the container.

Other objects and advantages of the present invention will become apparent from a study of the following specification when viewed in the light of the accompanying single FIGURE of drawing, which diagrammatically illustrates a cross-sectional view of the dosage apparatus.

Referring now to the drawing, the constant level liquid container means comprises a plurality of compartments 1, 2 and 3 connected in series by conduits 4 and 5. The liquid to be dispensed is supplied to the container means from a separate reservoir 6 that is provided at its lower end with a downwardly-directed short feed pipe 7 which projects into the upper end of the container compartment 1. The reservoir 6 comprises a receptacle such as a bottle having a greater capacity the neck portion of which projects downwardly into the container compartment 1. By virtue of this provision it is possible to automatically maintain in the container section 1, without the aid of float gauges or other regulating means, a liquid level whose free surface is maintained at the height of the opening at the lower extremity of the short feed pipe 7.

Furthermore, the dosage pump means is preferably so combined with the third container section 3 that the dosage pump means including the measuring chamber 8, the movable measuring piston 9, as well as the annular gasket 10 sealing the piston 9 will be disposed at all times below the level of the free liquid surface which is to be maintained in the container means. According to the preferred embodiment of the present invention, the dosage pump means is operable in synchronism with slide valve means 13 including an inlet passage 11 through which a given volume of liquid is withdrawn from container section 3 during the suction stroke of piston 9, and an outlet passage 12 through which the selected dosage liquid is supplied to the nozzle means 15 via flexible conduit 14 during the discharge stroke of the piston. Both the slide valve plunger and the piston 9 are moistened by the liquid to be dispensed. The provision and arrangement of the dosage pump means as a whole is finally so made that both the actuating rod 9' for displacing the measuring piston 9 and the actuating rod 13' for displacing the slide 13 extend upwardly through the free liquid surface and out of the container compartment 3.

In accordance with a characteristic feature of the present invention, nozzle positioning means are provided for displacing the nozzle 15 from the illustrated partially submerged storage position in the upper end of the container section 2 to a dispensing position relative to a receiving receptacle 16 for the purpose of supplying the latter with the liquid to be dispensed. This nozzle positioning means essentially consists of an arm 17 carrying the nozzle 15 and including vertically projecting portions pivotally connected with gears 18 and 19, respectively. When the gears are driven by the drive pinion 20, arm 17 is displaced to the right to displace the nozzle to the position 17' illustrated by the phantom lines.

The drawing illustrates the initial storage position of the elements 14, 15, 17 as well as the position of rest of the measuring piston 9 and of the slide valve plunger 13. This position of rest is intended to be assumed whenever the dosage apparatus is not in use for a prolonged period of time. In view of the fact that, in this position of rest, the nozzle 15 remains immersed in the liquid to be dispensed, bubbles which might result in a faulty discharge of the liquid during the next use of the dosage apparatus cannot be formed in the duct of the nozzle adjacent the opening. If a nozzle 15 were not immersed in the liquid to be dispensed for a long period of time, the opening duct thereof would dry out progressively. Depending upon the properties of the liquid to be dispensed, such drying-out may either lead to the obstruction of the nozzle 15, or reduce to an inadmissible degree the volume of liquid present therein. It is these sources of errors which impair the operational readiness of the dosage apparatus that are effectively obviated in accordance with the present invention merely by virtue of the fact that the nozzle 15 is immersed in the liquid to be dispensed. One prerequisite therefor, however, consists in that a sufficiently constant liquid level be maintained in the container compartment 2.

When using as basis the initial storage position illustrated in the drawing, the operation of the dosage apparatus according to the present invention may be described as follows. By pulling up the piston 9 in correspondence with the volume of liquid to be dispensed, the liquid is transferred from the container compartment 3 through the inlet valve 11 into the measuring chamber 8. The slide 13 is thereafter lifted so that the inlet valve 11 is closed while the outlet valve 12 is opened. At the same time the nozzle 15 may therewith be displaced by means of the nozzle positioning means 17—20 into the dispensing or discharge position 15' shown in phantom in which it is either positioned over the opening of the receiving receptacle 16 or immersed in the latter, as may be desired. By thereafter moving the measuring piston 9 downwardly, there results a pressing or forcing of the liquid out of the measuring chamber 8 into the line 14 and from there through the nozzle 15 into the receiving receptacle 16. Thereupon the slide 13 is lowered until the outlet valve 12 is closed and the inlet valve 11 opened once again. By pivoting back the nozzle positioning means 17—20, the nozzle 15 is again immersed within the liquid that is present in the container compartment 2. The position of rest illustrated in the drawing is thus reestablished and, in this position, the dosage apparatus remains ready for use until such time as a further dosage need be carried out.

As is apparent from the arrows indicated in the drawing which mark the direction of flow of the liquid when dosing operations are carried out, the liquid is continuously regenerated in all of the container compartments 1 to 3. Fresh liquid which has been taken form the reservoir 6 flows particularly about the nozzle 15 at all times. Any deposit of residues on the nozzle 15 is thereby effectively prevented in a simple manner. Analogous considerations apply also to the annular gasket 10 which is in operative engagement with the measuring piston 9, as well as to the sealing surfaces present at the slide 13, since regenerating liquid flows around the latter constantly.

While in accordance with the Patent Statutes, the preferred form of the invention has been illustrated and described, it is apparent that other changes and modifications are within the scope of the present invention.

We claim:

1. Dosage apparatus for dispensing a predetermined volume of a liquid, comprising:
   container means 1, 2, 3 for receiving the liquid;
   means 6, 7 for maintaining the liquid at a constant predetermined level in said container means;
   discharge nozzle means 15 adapted to dispense the liquid;
   dosage pump means including a measuring chamber 8 adapted for communication with said container means, and piston means 9 alternately operable to suck into said chamber from said container means a selected quantity of liquid and to pump said selected quantity to said nozzle means, respectively;
   and nozzle positioning means 17—20 for displacing said nozzle means from an initial storage position at least partially immersed in the liquid to a discharge position relative to liquid receiver means.

2. Apparatus as defined in claim 1, wherein said liquid level maintaining means comprises liquid reservoir means 6 arranged at an elevation above said container means and including a downwardly-directed supply conduit 7 that extends within the upper portion of said container means and terminates at its lower extremity at the height of the predetermined liquid level.

3. Apparatus as defined in claim 1, wherein said dosage pump means further includes slide valve means 13 alternately operable between supply and discharge positions for connecting said measuring chamber with said container means and with said nozzle means, respectively.

4. Apparatus as defined in claim 3, wherein said piston means and said slide valve means each include operating rods 9', 13' that extend upwardly completely through the liquid contained in said container means.

5. Apparatus as defined in claim 4, where said measuring chamber, said piston means and said slide valve means are arranged at a lower elevation than the level of the liquid contained in said container means.

6. Apparatus as defined in claim 2, wherein said container means includes a plurality of compartments 1, 2, 3, and passage means 4, 5 connecting said compartments in series arrangement, said compartments being so arranged that each contains liquid at the same predetermined level.

7. Apparatus as defined in claim 6, wherein a first one of said container compartments 1 is adapted to initially receive liquid from said reservoir means; wherein a second one of said compartments 2 is arranged to receive said nozzle means when said nozzle means are in the storage position; and further wherein a third one of said container compartments 3 is adapted to supply the liquid that is pumped to said measuring chamber by said dosage pump means.

8. Apparatus as defined in claim 3, where said nozzle means includes a downwardly directed nozzle, and flexible conduit means 14 connecting said nozzle with the outlet of said slide valve mans when said slide valve means is in the discharge position.